(12) United States Patent
Kohlhammer et al.

(10) Patent No.: US 6,884,837 B2
(45) Date of Patent: *Apr. 26, 2005

(54) CROSSLINKABLE POLYMER COMPOSITION

(75) Inventors: Klaus Kohlhammer, Marktl (DE); Abdulmajid Hashemzadeh, Burgkirchen (DE)

(73) Assignee: Wacker Polymer Systems, GmbH & Co., Burghausen (DE)

(*) Notice: Subject to any disclaimer, the term of this patent is extended or adjusted under 35 U.S.C. 154(b) by 366 days.

This patent is subject to a terminal disclaimer.

(21) Appl. No.: 09/804,495

(22) Filed: Mar. 12, 2001

(65) Prior Publication Data

US 2001/0034399 A1 Oct. 25, 2001

(30) Foreign Application Priority Data

Mar. 23, 2000 (DE) .......................................... 100 14 399

(51) Int. Cl.⁷ .............................. C08K 3/20; C08F 8/30
(52) U.S. Cl. ....................... 524/501; 525/107; 525/123; 525/129; 525/396; 525/455
(58) Field of Search .................. 524/501; 525/107, 525/123, 129, 396, 455

(56) References Cited

U.S. PATENT DOCUMENTS

| | | | |
|---|---|---|---|
| 4,129,545 A | 12/1978 | Sunamori et al. | |
| 4,451,315 A | 5/1984 | Miyazaki | |
| 4,528,329 A | 7/1985 | Inoue et al. | |
| 5,207,954 A | 5/1993 | Lewis et al. | |
| 5,668,216 A | 9/1997 | Kinkel et al. | |
| 5,869,568 A | 2/1999 | Maeda | |
| 5,977,244 A | 11/1999 | Kohlhammer et al. | |
| 6,599,455 B1 * | 7/2003 | Wierer et al. ................ | 264/118 |

FOREIGN PATENT DOCUMENTS

| | | |
|---|---|---|
| AU | 36659/89 | 4/1990 |
| DE | 27 01 490 | 7/1977 |
| DE | 19733133 | 2/1999 |
| EP | 0 080 144 | 6/1983 |
| EP | 0 721 004 | 7/1996 |
| EP | 0 894 888 | 2/1999 |
| EP | 0 894 888 A1 | 2/1999 |
| JP | 56081340 | 7/1981 |
| WO | 90-14457 | 11/1990 |
| WO | WO 94/20661 | 9/1994 |
| WO | 94/20661 | 9/1994 |

OTHER PUBLICATIONS

Derwent Abstract Corresponding To JP A 56081340 [AN 1981–610670].
International Search Report—mailed May 14, 2001.
Derwent Abstract Corresponding To DE 19733133 [AN 1999–108373].
Derwent Abstract Corresponding to WO 94/20661 [AN 1994–280617].

* cited by examiner

Primary Examiner—Kriellion A. Sanders
(74) Attorney, Agent, or Firm—Brooks Kushman P.C.

(57) ABSTRACT

The present invention provides a crosslinkable polymer composition in the form of its aqueous polymer dispersion or polymer powder, including A) a copolymer having a glass transition temperature Tg or a melting temperature of $\geq 30°$ C. and containing units derived from one or more comonomers selected from the group consisting of vinyl esters of branched or unbranched alkylcarboxylic acids of 1 to 18 carbon atoms, acrylic esters or methacrylic esters of branched or unbranched alcohols of 1 to 15 carbon atoms, dienes, olefins, vinyl aromatics and vinyl halides and from 0.1 to 50% by weight, based on the total weight of the comonomers, of one or more ethylenically unsaturated carboxyl-containing comonomers, and B) a copolymer containing units derived from one or more comonomers selected from the group consisting of vinyl esters of branched or unbranched alkylcarboxylic acids of 1 to 18 carbon atoms, acrylic esters or methacrylic esters of branched or unbranched alcohols of 1 to 15 carbon atoms, dienes, olefins, vinyl aromatics and vinyl halides and from 0.1 to 50% by weight, based on the total weight of the comonomers, of one or more ethylenically unsaturated comonomers having functional groups capable of entering a covalent bond with the carboxyl groups of said copolymer A).

27 Claims, No Drawings

CROSSLINKABLE POLYMER COMPOSITION

BACKGROUND OF THE INVENTION

1. Field of the Invention

This invention relates to a crosslinkable polymer composition, the preparation thereof and the use thereof.

2. Background Art

Textile sheet materials produced by the customary methods for producing nonwovens, for example by the airlay, wetlay or spunlay process, require a binder for durable binding of the fibers and for increasing the resistance to mechanical stress. Even today mechanically consolidated textile sheet materials such as wovens, nonwoven scrims or needled fleece mats require a binder for certain applications. These applications include for example the consolidation of pulled cotton fiber mats produced by means of an aerodynamic process, the consolidation of needled natural fiber mats, binders for preforming high performance fabrics in composite applications, the lamination of high strength fabrics in ballistic applications, prebinding of fleece mats for fiber-reinforced thermosets or the binding of pulverulent substances into a textile sheet material such as activated carbon into filters or flame-retardant graphite on roof membranes.

These binders are customarily based on synthetic macromolecular compounds and, in the prior art, can be applied either in the form of solids, for example as powder, granulate or fiber, or in the form of liquids, for example as aqueous polymer dispersions or solutions. The increased strength of the textile sheet materials is due to the bonding of the fibers by the polymers which adhere to the fiber and so strengthen the fibrous structure.

WO-A 90/14457 discloses a process wherein carded glass fibers are mixed with thermoplastic powder, for example polypropylene, polyester or polyamide, and the fibrous structure is subsequently consolidated at elevated temperature and pressure. AU-B 36659/89 likewise describes a process for consolidating glass fiber materials by means of thermoplastic powders. The use of polyesters or polystyrene is recommended. The low strength of the thus bonded fibrous structures on contact with water or solvents is disadvantageous.

Since the glass transition temperatures or the melting temperatures of the binders are frequently exceeded at elevated temperatures, durable chemical crosslinking of the binders is required in order that a high temperature dimensional stability may be conferred on the fibrous structures. Processes are known for consolidating fiber materials composed of polyester, polyamide or cotton fibers using self-crosslinking polymer dispersions EP-A 80144 (U.S. Pat. No. 4,451,315). True, nonwoven fabrics of high strength are obtained, but the use of aqueous binders is prohibitively costly on the drying side. In addition, it is not a straightforward matter to disburse the binder in the fiber matrix.

U.S. Pat. No. 4,612,224 describes the consolidation of pulverulent crosslinkable copolymers based on phenol-formaldehyde resins. The disadvantage with this binder system is the large amount of formaldehyde emitted in the course of the production and use of the fiber materials thus consolidated.

WO-A 94/20661 (U.S. Pat. No. 5,668,216) describes self-crosslinking redispersible dispersion powders based on N-methylolacrylamide-containing vinyl ester copolymers or (meth)acrylic ester copolymers as fiber bonding agents. The disadvantage with this binder system is its relatively high melt viscosity in that setting requires an appreciable input of water into the fiber matrix.

DE-A 2701490 (U.S. Pat. No. 4,129,545) describes thermosetting copolymers based on acrylic esters and/or vinyl esters and additionally containing (meth)acrylic esters of mono- or polyfunctional hydroxycarboxylic acids and N-alkoxyalkyl(meth)acrylamide as crosslinking component for use as a powder paint.

EP-A 721004 discloses crosslinkable water-dispersible powders is including both filming polymers having at least one functional group and reactive components which form chemical bonds on dispersion of the powders in water. Aqueous dispersions of this polymer blend are useful for coating applications. There is no mention in this patent application of utility for fiber bonding in nonwovens.

EP 894888 (U.S. Pat. No. 5,977,244) discloses chemically crosslinkable polymer powders comprising a dry pulverulent thermoplastic copolymer preparation based on the one hand on aqueous copolymer dispersions having a glass transition temperature above room temperature and on the other on a solid reactive crosslinker component having a melting point of less than 150° C. The disadvantage with this binder composition is that the chemical crosslinker agents sed therein do not have universal agility, but have to be compatible with the polymers to be crosslinked. Furthermore, in these self-crosslinking systems, a chemical crosslinking reaction can take place only after appropriate diffusion of the crosslinker substances into the polymer matrix.

U.S. Pat. No. 5,869,568 has room temperature crosslinking aqueous polymer dispersions consisting of two-phase polymer particles having a core of epoxy-functional copolymer and a shell of carboxyl-functional copolymer and low molecular weight epoxy-functional epoxy compounds enclosed between the phases. These systems are based on a core-shell structure that requires a relatively complicated polymerization process to actualize.

It is an object of the present invention to provide binders, especially for consolidating and for laminating fiber materials, that may be used in powder form, that process with a lower melt viscosity than the prior art and substantially without emitting harmful substances, and that confer high strength and heat resistance on the fibrous structure after processing.

SUMMARY OF THE INVENTION

This object is achieved by a crosslinkable polymer composition in the form of its aqueous polymer dispersion or Polymer powder, including A) a copolymer having a glass transition temperature Tg or a melting temperature of $\geq 30°$ C. and containing units derived from one or more comonomers selected from the group consisting of vinyl esters of branched or unbranched alkylcarboxylic acids of 1 to 18 carbon atoms, acrylic esters or methacrylic esters of branched or unbranched alcohols of 1 to 15 carbon atoms, dienes, olefins, vinyl aromatics and vinyl halides and from 0.1 to 50% by weight, based on the total weight of the comonomers, of one or more ethylenically unsaturated carboxyl-containing comonomers, and B) a copolymer containing units derived from one or more comonomers selected from the group consisting of vinyl esters of branched or unbranched alkylcarboxylic acids of 1 to 18 carbon atoms, acrylic esters or methacrylic esters of branched or unbranched alcohols of 1 to 15 carbon atoms, dienes, olefins, vinyl aromatics and vinyl halides and from 0.1 to 50% by weight, based on the total weight of the comonomers, of one or more ethylenically unsaturated comonomers having functional groups capable of entering a covalent bond with the carboxyl groups of said copolymer A).

DETAILED DESCRIPTION OF THE PREFERRED EMBODIMENT(S)

Useful vinyl esters include vinyl esters of branched or unbranched carboxylic acids of 1 to 18 carbon atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids of 9 to 11 carbon atoms, for example VeoVa9® or VeoVa10® (trade names of Shell). Vinyl acetate is particularly preferred.

Useful monomers from the group of the esters of acrylic acid or methacrylic acid include esters of branched or unbranched alcohols of 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate, norbornyl acrylate. Particular preference is given to methyl acrylate, methyl methacrylate, n-butyl acrylate, 2-ethylhexyl acrylate and norbornyl acrylate.

Useful dienes include 1,3-butadiene and isoprene. Examples of copolymerizable olefins are ethene and propene. Useful vinylaromatics include styrene and vinyltoluene. Vinyl chloride is the customary vinyl halide.

Useful carboxyl-functional comonomers for copolymer A) include ethylenically unsaturated mono- and dicarboxylic acids, preferably acrylic acid, methacrylic acid, crotonic acid, itaconic acid, fumaric acid and maleic acid. The carboxyl function may also be introduced by copolymerizing maleic anhydride into the copolymer A). The fraction of carboxyl-containing comonomer units in copolymer A) is preferably 1 to 30% by weight, particularly preferably 3 to 25% by weight, most preferably 5 to 20% by weight, each based on the total weight of the comonomers.

Useful comonomers having crosslinking, functional groups for copolymer B) include comonomers having an epoxide, organo, halogen, hydroxyl, aziridine, carbodiimide, oxazoline, alcohol, amine, aminosilane, aminoformaldehyde, isocyanate, N-2-hydroxyalkylamide moiety, preferably ethylenically unsaturated comonomers having epoxide, hydroxyl and isocyanate groups.

Particular preference is given to epoxide-functional comonomers such as glycidyl acrylate, glycidyl methacrylate, allyl glycidyl ether, vinyl glycidyl ether, vinylcyclohexene oxide, limonene oxide, myrcene oxide, caryophyllene oxide and also styrenes, vinyltoluenes and vinyl benzoates that are each glycidyl-substituted on the aromatic ring. Most preference is given to glycidyl acrylate, glycidyl methacrylate, allyl glycidyl ether, vinyl glycidyl ether.

Particular preference is also given to hydroxyalkyl-functional comonomers such as hydroxyalkyl acrylates and methacrylates, for example hydroxyethyl, hydroxypropyl and hydroxybutyl esters of acrylic acid and methacrylic acid. Examples of isocyanate-functional comonomers are 2-methyl-2-isocyanatopropyl methacrylate and isopropenyl dimethylbenzyl isocyanate (TMI). The fraction of comonomer units in copolymer B) that contain crosslinking groups is preferably 1 to 30% by weight, is particularly preferably 3 to 25% by weight, most preferably 5 to 20% by weight, each based on the total weight of the comonomers.

Preference is given to the hereinbelow specified polymer compositions for the copolymers A) and B), which additionally include, in the amounts just described, the comonomer units just mentioned, which contain functional groups. The weight percentages and the fraction of carboxyl-containing comonomer units add up to 100% by weight in each case.

vinyl acetate polymers;

vinyl ester-ethylene copolymers, such as vinyl acetate-ethylene copolymers; vinyl ester-ethylene-vinyl chloride copolymers where the vinyl ester component is preferably vinyl acetate and/or vinyl propionate and/or one or more copolymerizable vinyl esters such as vinyl laurate, vinyl pivalate, vinyl 2-ethylhexanoate, vinyl esters of an alpha-branched carboxylic acid, especially vinyl;

versatate (VeoVa9®, VeoVa10®); vinyl acetate copolymers with one or more copolymerizable vinyl esters such as vinyl laurate, vinyl pivalate, vinyl 2-ethylhexanoate, vinyl esters of an alpha-branched carboxylic acid, especially vinyl versatate: (VeoVa9®, VeoVa10®), which optionally contain ethylene as well; vinyl ester-acrylic ester copolymers, especially with vinyl acetate, and butyl acrylate and/or 2-ethylhexyl acrylate, which optionally contain ethylene as well;

vinyl ester-acrylic ester copolymers with vinyl acetate and/or vinyl laurate and/or vinyl versatate and acrylic esters, is especially butyl acrylate or 2-ethylhexyl acrylate, which optionally contain ethylene as well.

Particular preference is given to (meth)acrylic acid and styrene polymers:

copolymers with n-butyl acrylate and/or 2-ethylhexyl acrylate;

copolymers of methyl methacrylate with butyl acrylate and/or 2-ethylhexyl acrylate, and/or 1,3-butadiene;

styrene-1,3-butadiene copolymers and styrene-(meth)acrylic ester copolymers such as styrene-butyl acrylate, styrene-methyl methacrylate-butyl acrylate or styrene-2-ethylhexyl acrylate, where the butyl acrylate used can be n-, iso-, tert-butyl acrylate.

Preferably the comonomers in the above-indicated copolymers are copolymerized in such a ratio that both copolymer A) and copolymer B) have a melting point or a glass transition temperature Tg of $\geq 45°$ C.

The blend ratio of the two copolymers A) and B) is between 1:99 and 99:1, preferably copolymers A) and B) are present in such a ratio that the molar ratio of functional comonomer units of copolymer A) to copolymer B) is in the range from 5:1 to 1:5. Particular preference is given to blend ratios of 2:1 to 1:2 for copolymer A) to copolymer B), based on the molar ratio of functional comonomer units. The copolymers A) and B) are selected for the polymer composition so that they are compatible with each other, i.e. miscible with each other at the molecular level. The usual procedure is therefore to polymerize the copolymers A) and B) which are present in the polymer composition largely from the is same comonomer units, apart from the functional comonomer units. Most preference is therefore given to compositions with carboxyl-functional styrene-butyl acrylate and/or styrene-methyl methacrylate-butyl acrylate copolymer as copolymer A) and with glycidyl-methacrylate-containing styrene-butyl acrylate and/or styrene-methyl methacrylate-butyl acrylate copolymer as copolymer B).

Copolymer A) and copolymer B) may be prepared by means of known free-radically initiated polymerization processes, for example by means of solution or aqueous emulsion polymerization. Preferably both copolymer A) and copolymer B) are prepared by the emulsion polymerization process. Particular preference is given to a procedure where one of the two copolymers A) or B) is prepared by emulsion polymerization and thereafter the comonomers are polymerized to polymerize the respectively other comonomer to form core-shell particles and, if desired the dispersion obtained thereby is dried.

To prepare the polymer composition, preferably the emulsion-polymerized aqueous dispersions obtained for the copolymers A) and B) are blended with each other and subsequently dried. In an alternative embodiment, the dispersions or solutions of copolymers A) and B) are each initially dried and the copolymers A) and B) are blended in the specified blend ratio in powder form. The solutions or dispersions may be dried using any customary drying process: spray drying, drum drying, freeze drying, belt drying, coagulation with subsequent fluidized bed drying, etc. Preference is given to using spray drying and drum drying processes.

The polymer composition may be used in dry pulverulent form, in the form of an aqueous dispersion or in solvent-dissolved form. Preferably the polymer composition is used as a powder, especially as a water-redispersible powder.

The polymer composition is useful as a binder for preparing shaped articles from fiber materials or from particulate materials comprising mineral materials, plastics materials or natural materials, such as wood chips, cork particles, glass particles or glass powders, especially recycled content glass and hollow glass balls, or comprising combinations of these materials. The shaped articles are produced at room temperature or elevated temperature, if necessary under elevated pressure, depending on the end use.

The temperature for consolidating the shaped articles is generally 20° C. to 220° C. The range for an elevated temperature is preferably from 90 to 220° C. When the shaped articles are produced under pressure, pressures of 1 to 200 bar are preferred. The polymer composition is generally used in an amount of 3 to 50% by weight, based on the material to be bound. The binder quantity depends on the substrate to be bound and is between 4 and 30% by weight in the case of polyester fibers and cotton fibers and preferably in the range from 20 to 40% by weight in the case of natural fibers, such as hemp, flax, sisal, jute, for example for applications in the automotive interior. In the case of glass and mineral fibers and in the case of other mineral materials, such as glass balls, the preferred range is between 4 and 30%.

The preferred use is that as a binder for fiber materials. Useful fiber materials are natural or synthetic raw materials. Examples thereof are manufactured fibers based on fiber-forming polymers such as viscose, polyester, such as polyester chopped fibers, polyamide, polypropylene, polyethylene fibers. It is also possible to use mineral fibers, such as glass fibers, ceramic fibers, carbon fibers. Examples of natural fiber materials are wood, cellulose, wool, cotton, jute, flax, hemp, coir, ramie and sisal fibers. The fibers can also be used in the form of woven textiles, in the form of yarns or in the form of nonwovens such as nonwoven scrims or formed-loop knits. The nonwovens may optionally be mechanically preconsolidated, for example needled.

Preference is given to the use as a prebinder in fiber mats, wovens and nonwoven scrims for fiber-reinforced plastics; the use as a binder for preforming applications of wovens and nonwoven scrims in fiber-reinforced plastics, in which case the preferred binder quantity is between 3 and 10% by weight, more preferably between 4 and 6% by weight; the use as a dry binder in combination with other pulverulent organic or inorganic substances; and the use as a binder for laminating fiber mats onto expanding or expanded bead foam. Here the preferred binder quantity is between 20 and 100 g/m$^2$, particularly preferably between 30 and 70 g/m$^2$.

A possible procedure for these applications is for the fibers optionally together with organic or inorganic fillers, to be mixed with the polymer composition of the invention and for the fiber-powder mixture to be spread out by the customary methods of nonwovens technology, optionally after carding of the fiber-powder mixture and needling, and bonded by temperature elevation, optionally with the employment of pressure and/or superheated steam.

The fiber bonding may also be effected by sprinkling the polymer composition of the invention into a woven, an unwoven scrim or a previously deposited fiber bed and, optionally after carding of the fiber-powder mixture and needling, for the bonding powder to be melted and cured by temperature elevation, optionally with additional employment of pressure and/or superheated steam.

The polymer composition is also useful for laminating two or more wovens, nonwoven scrims or nonwovens together, as a binder between the two substrates to be adhered together. To this end, the polymer preparation is introduced between the layers and the laminate is bonded by temperature elevation, optionally with additional employment of pressure and/or superheated steam.

In a preferred embodiment, a ready-produced molding is laminated by sprinkling a pulverulent polymer composition onto a textile sheet material and the binder is optionally bound (by incipient sintering) on the textile sheet material at elevated temperature. The thus treated textile sheet material is then laminated onto a ready-produced molding, for example onto a foamed molding, by employing an elevated pressure and an elevated temperature. If necessary, the molding can be thermally aftertreated for residual devolatilization and for producing the final dimensional stability and the final dimensions.

Alternatively, the polymer composition may be applied to a previously foamed molding and if desired incipiently sintered on the molding at elevated temperature. The thus treated molding subsequently has a textile sheet material laminated onto it at is elevated pressure and temperature, either in the corresponding mold or outside the mold used for foaming. If necessary, the molding can be thermally aftertreated for residual devolatilization and for producing the final dimensional stability and the final dimensions.

A particularly preferred application of the polymer composition in powder form is in-mold skinning. In a first version of the process, the powder is applied to a textile sheet material and optionally sintered to it. The thus treated textile sheet material is placed in a suitable mold and the polymer particles to be foamed are added. The particles are expanded in the mold, and the foam is foamed against the textile sheet material bearing the binder. This is followed by the demolding of the laminated molding.

In a second version of the process, a textile sheet material is placed in a suitable mold, and the polymer powder is applied to the textile sheet material placed in the mold and optionally sintered to it. The polymer particles to be foamed are added and expanded. The laminated molding is then demolded and if necessary thermally aftertreated for residual devolatilization and for producing the final dimensional stability and the final dimensions.

In a third version of the process, first a textile sheet material is coated with a thermoplastic polymer (e.g. polyethylene, polypropylene, polyester) by laminating or by coating by means of a corresponding thermoplastic polymer melt and subsequently the pulverulent polymer preparation is applied to the uncoated side of the textile sheet material and optionally sintered to it. The thus pretreated textile sheet material is placed in the mold, the polymer particles to be foamed are added and expanded and the foam is foamed against the textile sheet material. Demolding and, if necessary, thermal aftertreatment of the molding are carried out similarly to the first two versions of the process.

The polymer composition of the invention is notable for a surprisingly low melt viscosity even though crosslinkable compounds are present in the polymer melt. The invention provides a binder, especially for the textile sector, that cures significantly faster, produces a higher heat resistance and has an extremely low melt viscosity above the glass transition temperature of the resin, compared with prior art binders.

The polymer composition in powder form is also useful for binding pulverulent substrates in fiber materials. To this end, the polymer powder is mixed in the dry state with organic or inorganic pulverulent substances, this mixture is sprinkled on or into a textile sheet material or fiber bed, and the bonding powder is cured by temperature elevation, if necessary with additional employment of pressure and/or superheated steam, to effect bonding between the organic or inorganic powders and the fibers.

The examples hereinbelow illustrate the invention:

EXAMPLE 1
Preparation of a Carboxyl-Functional Styrene-Butyl Acrylate-Methacrylic Acid-Acrylamide Interpolymer:

In a 3 liter capacity reactor, 838.8 g of deionized water and 6.7 g of sodium lauryl sulfate are heated to 80° C. under nitrogen with stirring. At 80° C. the initiator solution (6.7 g of potassium peroxodisulfate and 218.4 g of water) was introduced into the reactor and the following compositions were metered into the reactor from separate containers in the course of 4 hours:

Monomer feed 1 with 67.3 g of methacrylic acid, 403.7 g of butyl acrylate, 861.3 g of styrene and 6.7 g of dodecyl mercaptan.

Monomer feed 2 with 67.3 g of water, 44.9 g of a 30% aqueous acrylamide solution.

And an initiator feed with 217.6 g of water and 6.7 g of potassium peroxodisulfate.

Afterwards the batch was postpolymerized at 80° C. for about 2 hours and adjusted with ammonia to pH 8.

EXAMPLE 2
Preparation of a Carboxyl-Functional Styrene-Butyl Acrylate-Methacrylic Acid-N-Methylolacrylamide Interpolymer:

In a 3 liter capacity reactor, 855 g of deionized water and 6.7 g of sodium lauryl sulfate are heated to 80° C. under nitrogen with stirring. At 80° C. the initiator solution (6.7 g of potassium peroxodisulfate and 217.4 g of water) was introduced into the reactor and the following compositions were metered into the reactor from separate containers in the course of 4 hours:

Monomer feed 1 with 67.2 g of methacrylic acid, 403.4 g of butyl acrylate, 860.5 q of styrene and 6.7 g of dodecyl mercaptan.

Monomer feed 2 with 67.3 g of water, 28.0 g of a 48% aqueous N-methylolacrylamide solution.

An initiator feed with 217.4 g of water and 6.6 g of potassium peroxodisulfate.

Afterwards the batch was postpolymerized at 80° C. for about 2 hours and adjusted with ammonia to pH 8.

EXAMPLE 3
Preparation of an Epoxide-Functional Styrene-Butyl Acrylate-Glycidyl Methacrylate Interpolymer:

In a 3 liter capacity reactor, 667.1 g of deionized water, 2.5 g of sodium bicarbonate and 10 g of sodium lauryl sulfate, 3.0 g of potassium peroxodisulfate, 74.7 g of styrene and 49.8 g of butyl acrylate were heated at 75° C. under nitrogen with stirring. This initial charge was polymerized at 75° C. for about 15 minutes before a start was made on metering monomer, emulsifier and initiator into the reactor from separate containers. The monomer mixture and the emulsifier solution were metered in over 4 hours and the initiator solution over 5 hours.

The monomer feed was made up of 49.8 g of glycidyl methacrylate, 248.9 g of butyl acrylate, 572.5 g of styrene and 5.0 g of dodecylmercaptan.

The emulsifier feed was made up of 262.4 g of water and 10.0 g of sodium lauryl sulfate.

The initiator feed was made up of 99.6 g of water and 3.0 g of potassium peroxodisulfate.

After the monomer mixture had been metered in, the polymerization temperature was raised to 80° C. On completion of the initiator metering the batch was postpolymerized at 80° C. for about 1 hour. The pH during the polymerization was between 6.5 and 7.0. After cooling the pH was adjusted to 7.5 with ammonia olution. The solids content of the dispersion was 50% and the viscosity was 2420 mPas.

EXAMPLE 4

Preparation of an epoxide-functional styrene-butyl acrylate-glycidyl methacrylate interpolymer Example 3 was repeated except that the glycidyl methacrylate quantity in the monomer mixture was reduced to 24.9 g and the styrene quantity raised to 597.4 g.

After cooling the pH was adjusted to 7.5 with ammonia solution. The solids content of the dispersion was 50% and the viscosity was 2300 mPas.

EXAMPLE 5
Preparation of the Crosslinkable Polymer Composition

The polymer dispersions of Examples 1 and 3 were mixed with each other in a weight ratio of 1:1 (solid:solid) and spray dried. The result was a free-flowing powder having a particle size of about 251 µm (volume average). DSC analysis revealed a glass transition temperature of 49° C. and an exothermic DSC peak at 185° C. The powder formed a clear polymer melt above 150° C. As well as the exothermic DSC peak, the chemical crosslinkability of the polymer was measured by determining the gel time, i.e. the time between the melting of the powder to form a clear liquid and the gelling of this melt to form a solid mass. The gel time at 210° C. was 20 sec.

EXAMPLE 6
Preparation of the Crosslinkable Polymer Composition

The polymer dispersions of Examples 1 and 4 were mixed with each other in a weight ratio of 1:1 (solid:solid) and spray dried. The result was a free-flowing powder having a particle size of about 20 µm (volume average). DSC analysis revealed a glass transition temperature of 48° C. and an exothermic DSC peak at 182° C. The powder formed a clear polymer melt above 150° C. The gel time at 210° C. was 40 sec.

EXAMPLE 7 (COMPARATIVE)

The dispersion of Example 2 was spray dried and 98 parts by weight of the powder mixed with 2 parts by weight of a pulverulent epoxide crosslinker (Epicote).
Preparation of Fibrous Moldings for Testing:
Wet-Pressed Moldings:

To produce compression molded panels, 115 g of reclaimed cotton were mixed with 13.2 g of binder powder of Inventive Examples 5 and 6 and Comparative Example 7 and spread out over an area 24×24 cm in size. The fiber-powder mixtures were additionally moistened with 40 g of water applied by spraying and immediately thereafter compression molded at a temperature of 180° C. for 5 min to produce rigid panels 2 mm in thickness or flexible panels 10 mm in thickness, each having a basis weight of about 2200 g/m$^2$ and a density of about 1115 kg/m$^3$ or 223 kg/m$^3$ respectively.
Dry-Pressed Moldings:

To produce compression molded panels, 115 g of reclaimed cotton were mixed with 13.2 g of binder powder of Inventive Examples 5 and 6 and Comparative Example 7 and spread out over an area 24×24 cm in size. The fiber-powder mixtures were immediately thereafter compression molded at temperatures about 180° C. for 5 min to produce rigid panels 2 mm in thickness or flexible panels 10 mm in thickness, each having a basis weight of about 2200 g/m$^2$ and a density of about 1115 kg/m$^3$ or 223 kg/m$^3$ respectively.

Test Methods:
Ultimate Tensile Strength UTS:

The fibrous compression moldings were punched to form test specimens measuring 10 mm×100 mm before testing at room temperature on a Zwick tensile tester similarly to DIN 53857.
Water Imbibition:

The test specimens (dimensions: 50 mm×20 mm) were immersed in water for 1 h or 24 h and the weight increase due to waterswelling was determined gravimetrically.
Heat Resistance:

Strips 240 mm×20 mm in length were cut from the test specimens. These strips were fixed horizontally on a planar substrate so that the strips overhung the edge of the substrate by 100 mm. In the case of the rigid moldings (panel thickness: 2 mm) a 40 g weight was attached, whereas the flexible moldings (panel thickness: 10 mm) were only subjected to the force of gravity of their own weight. The heat resistance was determined by measuring the deflection d after one hour at T=120° C.

The test results are summarized in Tables 1 and 2:

TABLE 1

Testing of rigid moldings (basis weight: 2200 kg/m$^2$, density: 1115 kg/m$^3$)

| | Molded Moist | | | Molded Dry | | |
|---|---|---|---|---|---|---|
| | | | | | | Water |
| | | Heat | Imbibition | | Heat | Imbibition |
| | UTS | Resistance | 1 h/24 h | UTS | Resistance | 1 h/24 h |
| Example | [N] | [mm] | [wt. %] | [N] | [mm] | [wt. %] |
| Inventive 5 | 938 | 15 | 36/41 | 728 | 15 | 75/88 |
| Inventive 6 | 919 | 17 | 40/45 | 701 | 18 | 87/101 |
| Inventive 7 | 948 | 21 | 48/57 | 560 | 22 | 139/161 |

TABLE 2

Testing of flexible moldings (basis weight: 2200 kg/m$^2$, density: 223 kg/m$^3$)

| | Molded Moist | | | Molded Dry | | |
|---|---|---|---|---|---|---|
| | | | | | | Water |
| | | Heat | Imbibition | | Heat | Imbibition |
| | UTS | Resistance | 1 h/24 h | UTS | Resistance | 1 h/24 h |
| Example | [N] | [mm] | [wt. %] | [N] | [mm] | [wt. %] |
| Inventive 5 | 36.0 | 12.0 | 295/325 | 19.3 | 21 | 502/54 |
| Inventive 6 | 32.8 | 15.0 | 289/311 | 18.8 | 24 | 568/60 |
| Inventive 7 | 11.9 | 14 | 589/662 | 7.9 | 39 | 987/994 |

EXAMPLE 8
Preparation of a Laminated Product from Expanding Bead Foam and a Glass Fiber Web The polymer powder of Example 5 was applied uniformly by electrostatic spray application (application weight: about 30 g/m$^2$) to a glass fiber mat (basis weight about 30 g/m$^2$ and sintered on at 180° C. for 90 sec. The thus treated glass web was then laminated at 120° C. and about 1.2 bar onto a foamed molding made from EPS/PPO. To test the strength of the bond, the laminated molding was stored at 90° C. for 1 h. An attempt was then made to peel off the laminated glass web by hand. Result: It was now impossible to remove the glass web from the foam surface. Instead, the glass fibers were pulled away from the glass web, or foam particles from the surface of the molding, without any delamination at the glass web/molding bond.

EXAMPLE 9

The polymer powder of Example 6 was uniformly applied by electrostatic spray application (application weight: about 50 g/m$^2$) to a glass fiber mat (basis weight about 30 g/m$^1$) and sintered on at 170° C. for 2 min. The thus treated glass web was then placed in a suitable mold, and the PS/PPO beads to be expanded were added. The PS/PPO beads were then foamed against the glass web using superheated steam. The thus produced molding was demolded and devolatilized at 80° C. for several hours. To assess strength after a change in atmospheric conditions, the laminated foam part was subjected to a total of three periods of alternating storage, in each case for a number of hours at 90° C. and −20° C. An attempt was then made to peel off the laminated glass web by hand.

Result: It was now impossible to remove the glass web from the foam surface. Instead, the glass fibers were pulled away from the glass web, or foam particles from the surface of the molding, without any delamination at the glass web/molding bond.

EXAMPLE 10 (COMPARATIVE)

A polyethylene powder was uniformly applied by electrostatic spray application (application weight: about 30 g/m$^2$) to a glass fiber mat (basis weight about 30 g/m$^2$) and sintered on at 180° C. for 90 sec. The thus treated glass web is subsequently laminated at 120° C. and about 1.2 bar against a foamed molding made from EPS/PPO. To test the strength of the bond, the laminated molding is stored at 90° C. for 1 h. An attempt is then made to peel off the laminated glass web by hand. Result: The glass web is easy to peel away from the foamed molding. The desired bond strength has therefore not been achieved.

EXAMPLE 11

The polymer powder of Example 5 was applied by means of an electrostatic powder spray gun to 12 plies of a woven aramid fiber fabric (twill construction) measuring 30 cm×30 cm in an amount of about 30 g/m$^2$. The thus treated fabric was treated at 170° C. for 2 min to sinter the powder to the fibers. The 12 plies were then stacked on top of each other and pressed together at 180° C. and 1 bar. The result was a rigid aramid fiber panel about 6 mm in thickness.

EXAMPLE 12 (COMPARATIVE)

12 plies of a woven aramid fiber fabric (twill construction) measuring 30 cm×30 cm were impregnated with a phenol-formaldehyde resin solution at a rate of about 30 g/m$^2$. The thus impregnated fabrics were then stacked on top of each other and pressed together at 180° C. and 1 bar. The result was again a rigid aramid fiber panel about 6 mm in thickness.

EXAMPLE 13 (COMPARATIVE)

12 plies of a woven aramid fiber fabric (twill construction) measuring 30 cm×30 cm were coated with a 50% aqueous dispersion of a styrene-butyl acrylate copolymer having an acrylic acid fraction of 5% and 5% of epoxide crosslinker (Epicote) in an amount of about 30 g/m$^2$. The thus impregnated fabrics were then stacked on top of each other and pressed together at 180° C. and 1 bar. This likewise provided a rigid aramid fiber panel about 6 mm in thickness.

Ballistic Resistance Test

Ballistic resistance was tested by shooting soft nose projectiles at the laminates from a distance of 10 m. While the laminate of Inventive Example 11 resisted the projectiles and did not allow any to pass through, all the projectiles passed through the laminates of Comparative Examples 12 and 13.

Preparation of a Glass Fiber Mat:

Glass rovings were randomly spread out on a support plate and each uniformly sprinkled with a powder of Example 5. Powder application was 5% by weight, based on the fiber weight. For consolidation, the support plate bearing the fiber-powder mixture was heated to 210° C. for 3 minutes to cause the powder to melt and penetrate the fibers and bond them together at the crossing points. The fiber mat obtained thereby was free of any discoloration.

Processing by the RTM (Resin Transfer Molding) Process:

A nonwoven carbon fiber scrim was laid out and grounded and the powder of Example 5 was applied by electrostatic spray application in an amount of 5% by weight, based on fiber weight. The mat was preconsolidated in a subsequent oven trip at 150° C./20 sec. The preconsolidated mat was then made into a semispherical shape in a compression mold.

The prebound and preshaped fabric was dimensionally stable and was readily transferable without loss of shape into an appropriately shaped injection mold.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A crosslinkable polymer composition in the form of its aqueous polymer dispersion or polymer powder, comprised of:
  A) a copolymer having a glass transition temperature Tg or a melting temperature of ≧30° C. and containing units derived from one or more comonomers selected from the group consisting of vinyl esters of branched or unbranched alkylcarboxylic acids of 1 to 18 carbon atoms, acrylic esters or methacrylic esters of branched or unbranched alcohols of 1 to 15 carbon atoms, dienes, olefins, and vinyl aromatics, and from 0.1 to 50% by weight, based on the total weight of the comonomers, of one or more ethylenically unsaturated carboxyl-containing comonomers, and
  B) a copolymer containing units derived from one or more comonomers selected from the group consisting of vinyl esters of branched or unbranched alkylcarboxylic acids of 1 to 18 carbon atoms, acrylic esters or methacrylic esters of branched or unbranched alcohols of 1 to 15 carbon atoms, dienes, olefins, and vinyl aromatics, and from 0.1 to 50% by weight, based on the total weight of the comonomers, of one or more ethylenically unsaturated comonomers having functional groups capable of entering a covalent bond with the carboxyl groups of said copolymer A).

2. A crosslinkable polymer composition as claimed in claim 1, wherein said carboxyl-containing comonomers copolymerized for said copolymer A) are ethylenically unsaturated mono- and dicarboxylic acids or maleic anhydride.

3. A crosslinkable polymer composition as claimed in claim 2, wherein one or more comonomers are selected from the group consisting of acrylic acid, methacrylic acid, crotonic acid, itaconic acid, fumaric acid, maleic acid and maleic anhydride.

4. A crosslinkable polymer composition as claimed in claim 1, wherein said copolymer A) contains 1 to 30% by weight of carboxyl-containing comonomer units.

5. A crosslinkable polymer composition as claimed in claim 1, wherein said copolymer B) comonomers having crosslinking, functional groups include one or more selected from the group consisting of comonomers having an epoxide, organo, halogen, hydroxyl, aziridine, carbodiimide, oxazoline, alcohol, amine, aminosilane, aminoformaldehyde, isocyanate and N-2-hydroxyalkylamide moiety.

6. A crosslinkable polymer composition as claimed in claim 5, wherein one or more ethylenically unsaturated comonomers having epoxide, hydroxyl and isocyanate groups have been copolymerized.

7. A crosslinkable polymer composition as claimed in claim 6, wherein one or more comonomers are selected from the group consisting of glycidyl acrylate, glycidyl methacrylate, allyl glycidyl ether, vinyl glycidyl ether, hydroxyethyl acrylate, hydroxypropyl acrylate, hydroxybutyl acrylate, hydroxyethyl methacrylate, hydroxypropyl methacrylate, hydroxybutyl methacrylate, 2-methyl-2-isocyanatopropyl methacrylate and isopropenyl dimethylbenzyl-,isocyanate (TMI).

8. A crosslinkable polymer composition as claimed in claim 1, wherein said copolymer B) contains 1 to 30% by weight of units derived from comonomers containing crosslinking groups, based on the total weight of the comonomers.

9. A crosslinkable polymer composition as claimed in claim 1, wherein the blend ratio of said two copolymers A) and B) is in the range from 1:99 to 99:1.

10. A crosslinkable polymer composition as claimed in claim 1, wherein said copolymers A) and B) are present in such a ratio that the molar ratio of functional comonomer units of copolymer A) to copolymer B) is in the range from 5:1 to 1:5.

11. A crosslinkable polymer composition as claimed in claim 1, wherein said copolymers A) and B) are present in such a ratio that the molar ratio of functional comonomer units of copolymer A) to copolymer B) is in the range from 2:1 to 1:2.

12. A crosslinkable polymer composition as claimed in claim 1, wherein said copolymer A) is a carboxyl-functional styrene-n-butyl acrylate and/or styrene-methyl methacrylate-n-butyl acrylate copolymer and said copolymer B) is a glycidyl methacrylate-containing styrene-n-butyl acrylate and/or styrene-methyl methacrylate-n-butyl acrylate copolymer.

13. A process for preparing crosslinkable polymer compositions as claimed in claim 1, which comprises separately preparing said copolymer A) and said copolymer B) by solution or aqueous emulsion polymerization and mixing copolymer A) with copolymer B) to form a solution or dispersion containing both copolymers A) and B), and optionally drying to form a polymer powder.

14. A process as claimed in claim 13, wherein both said copolymer and said copolymer B) are prepared by emulsion polymerization and, optionally, the thereby obtainable dispersions are dried.

15. A process as claimed in claim 14, wherein said emulsion-polymerized aqueous dispersions obtained for said copolymers A) and B) are blended with each other and subsequently dried.

16. A process as claimed in claim 14, wherein said emulsion-polymerized aqueous dispersion obtained for said copolymers A) and B) are each initially dried and said copolymers A) and B) are blended in the specified blend ratio in powder form.

17. A method for preparing shaped articles from fibrous or particulate materials, which comprise contacting said materials with the crosslinkable composition of claim 1 as at least one binder and effecting crosslinking of said materials.

18. The method of claim 17, wherein said polymer composition is present in an amount of 3 to 50% by weight, based on the material to be bound.

19. The method of claim 17, wherein said polymer composition is present in dry, pulverulent form, in the form of an aqueous dispersion or in solvent-dissolved form.

20. The method of claim 17, wherein said polymer composition is present as a water-redispersible powder.

21. The method of claim 17, wherein said polymer composition is present as a prebinder in fiber mats, wovens and nonwoven scrims for fiber-reinforced plastics.

22. The method of claim 17, wherein said polymer composition is present as a binder for preforming applications of wovens and nonwoven scrims in fiber-reinforced plastics.

23. The method of claim 17, wherein said polymer composition is present as a dry binder in combination with other pulverulent organic or inorganic substances.

24. The method of claim 17, wherein said polymer composition is present as a binder for laminating fiber mats onto expanding or expanded bead foam.

25. The method of claim 17, wherein said polymer composition is present for laminating two or more wovens, nonwoven scrims or nonwovens together, as a binder between the two substrates to be adhered together.

26. The method of claim 17, wherein said polymer composition is present in powder form for binding pulverulent substrates in fiber materials.

27. The method of claim 17, wherein said polymer composition is present for in-mold skinning of expanding bead foam.

* * * * *